Aug. 4, 1959 S. G. ESKIN ET AL 2,898,046
GAS WATER HEATER COMBINATION CONTROL VALVE
Filed Dec. 31, 1954 4 Sheets-Sheet 2
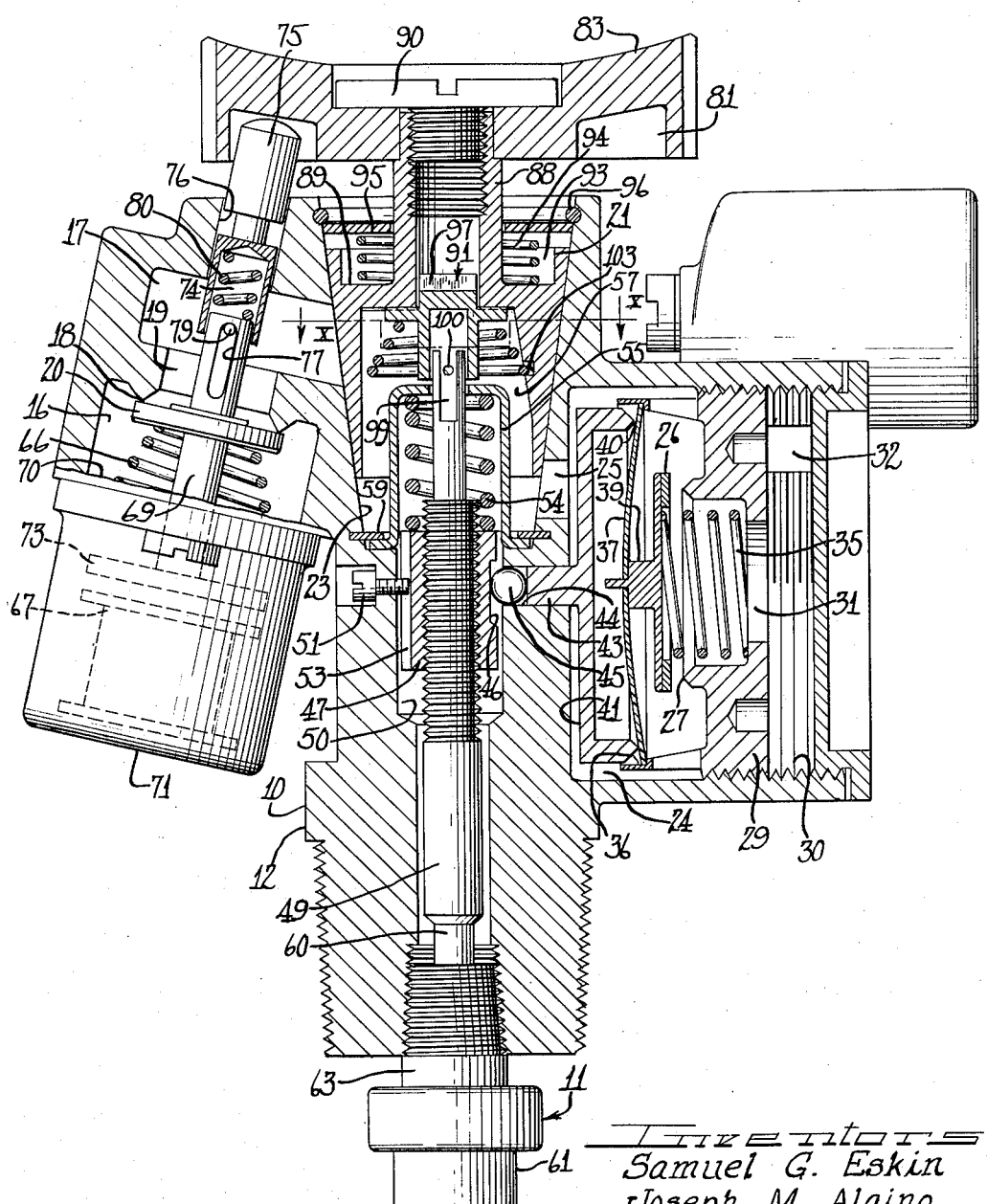
Inventors
Samuel G. Eskin
Joseph M. Algino
Thomas B. Legeza Aug. 4, 1959 S. G. ESKIN ET AL 2,898,046
GAS WATER HEATER COMBINATION CONTROL VALVE
Filed Dec. 31, 1954 4 Sheets-Sheet 3
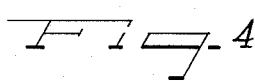
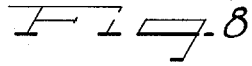
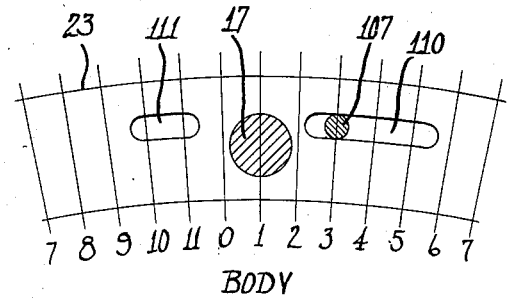
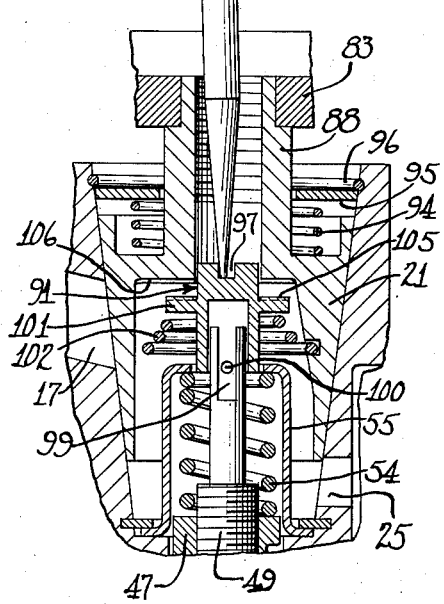
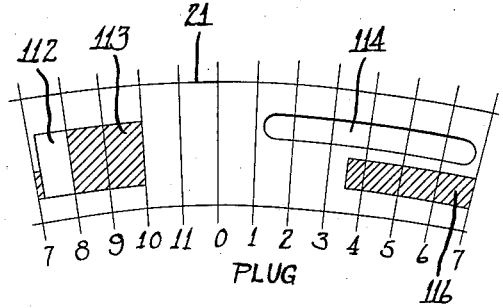
Inventors
Samuel G. Eskin
Joseph M. Algino
Thomas B. Legeza
Attys

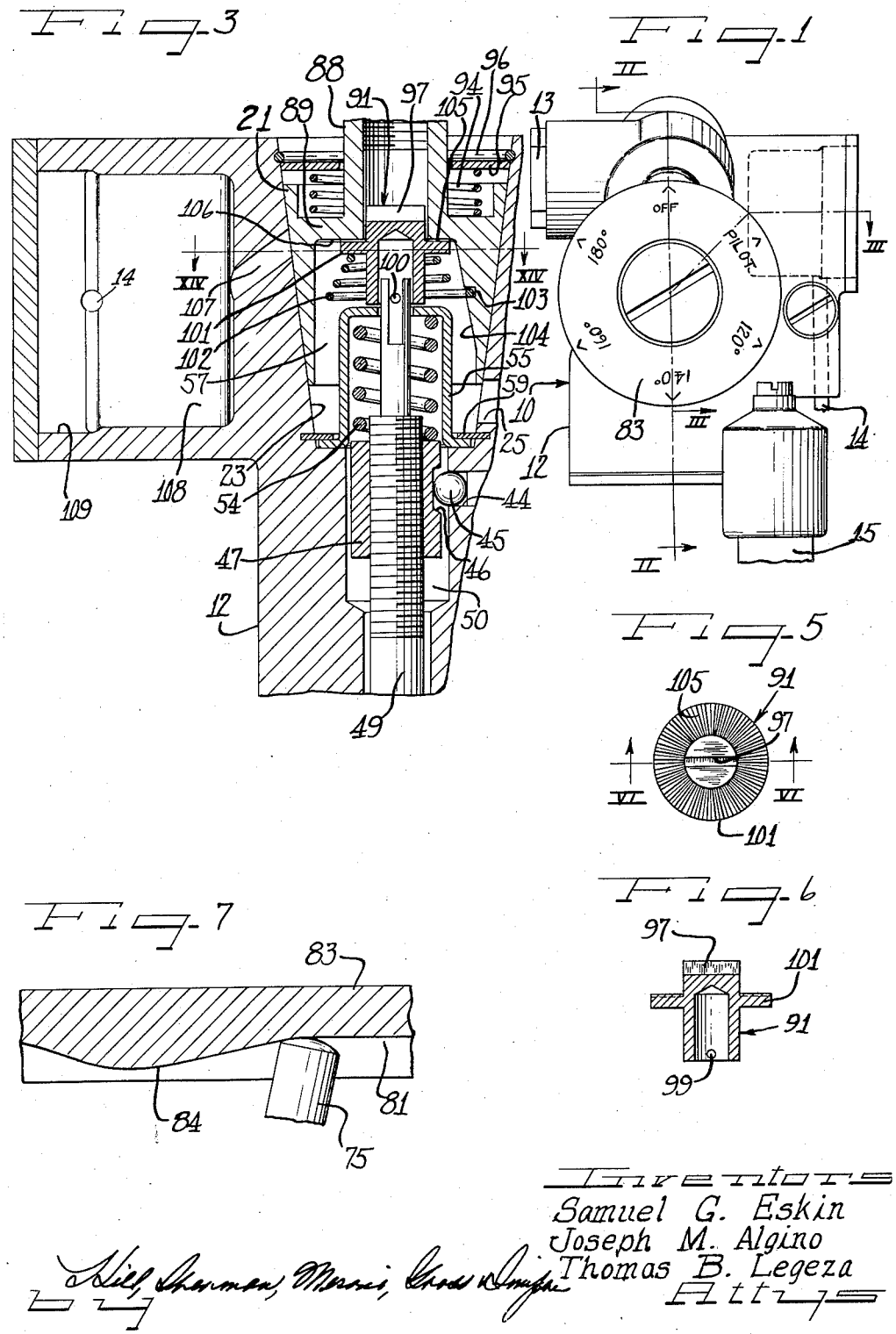

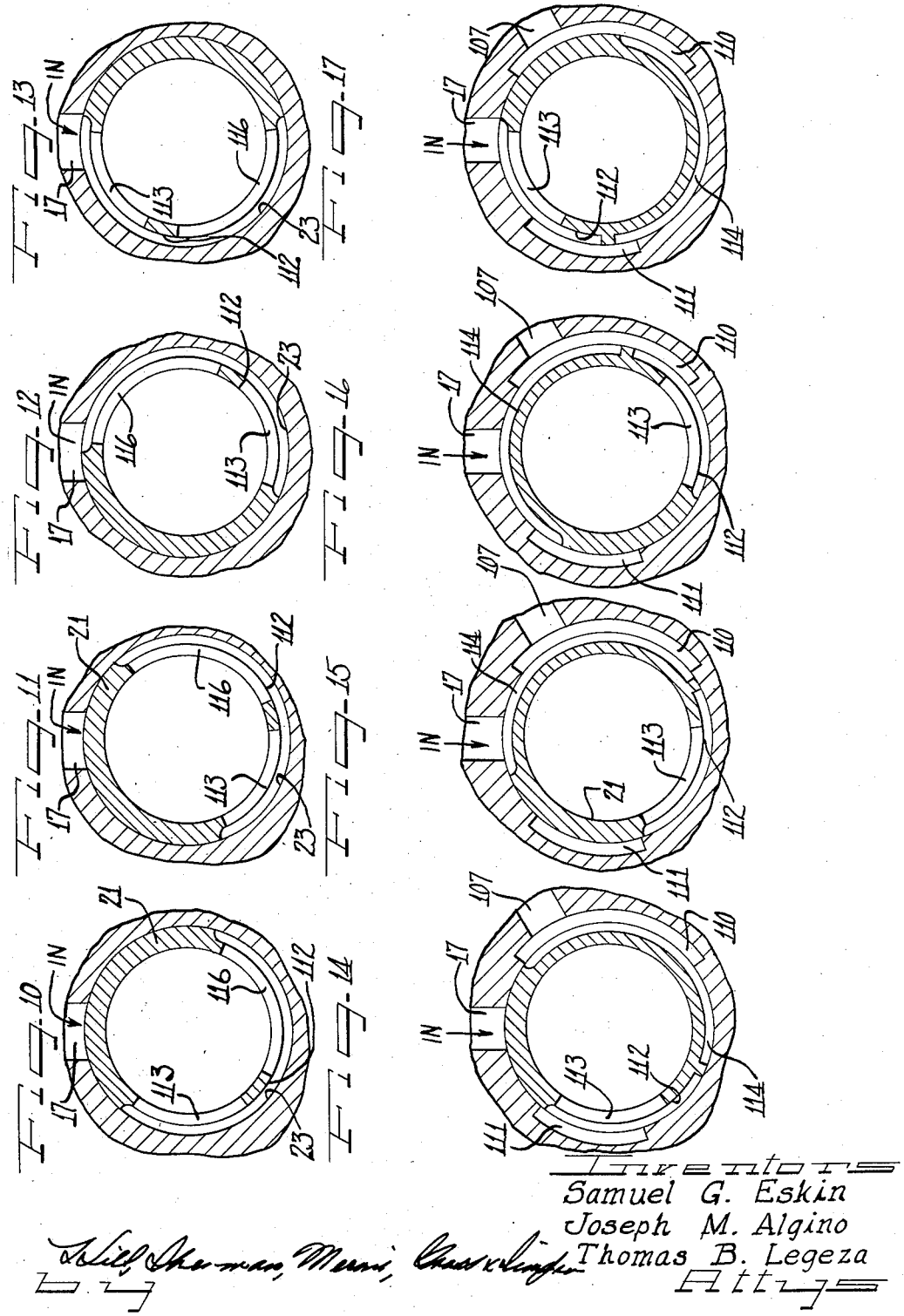

United States Patent Office 2,898,046
Patented Aug. 4, 1959

2,898,046

GAS WATER HEATER COMBINATION CONTROL VALVE

Samuel G. Eskin and Joseph M. Algino, Chicago, and Thomas B. Legeza, Westchester, Ill., assignors to The Dole Valve Company, Chicago, Ill., a corporation of Illinois Application December 31, 1954, Serial No. 479,020

3 Claims. (Cl. 236—21)

This invention relates to improvements in control valves for gas burners and the like and more particularly relates to a thermostatically controlled safety shut-off valve particularly adapted to control the supply of gas to the pilot and main burner of a gas hot water heater.

A principal object of our invention is to provide a simple and improved form of thermostatically controlled valve for a gaseous fuel burner, in which a single knob operates to effect the supply of gas to the valve, open the pilot and main burner in succession and adjust the temperature at which the main burner goes off.

Another object of the invention is to provide an improved form of gas burner valve in which a rotatable valve is provided to control the supply of gas to a pilot and main burner, and in which the operating knob for the valve serves to set the safety control upon turning of the knob to a pilot position.

Another object of the invention is to provide a thermostatically controlled fuel supply valve for a gaseous burner of a more simplified form than formerly, in which a single knob operable to control the main gas valve for supplying gas to the pilot and main burner, also sets the safety control valve and varies the temperature setting of the thermostatic element for shutting off the supply of gas to the burner.

A further object of the invention is to utilize a simple form of operating knob for a rotatable valve, to reset the safety control and set the thermostatic element for controlling the shutting off of the supply of gas to the main burner to operate at the desired operating temperature.

Still another object of this invention is to effect the setting of the safety control device for the valve, the opening of the main shut-off valve and the setting of the temperature to which the thermostatically controlled valve will shut off by the sequential rotation of the operating knob for the main shut-off valve.

Still another object of this invention is to provide a safety control gas shut-off valve in which a rotatable valve controls the supply of gas to the pilot and main gas burners, and also sets the thermostatic element effecting the shutting off of gas to the main gas burner to operate at the desired temperature, and in which a releasable drive connection is provided to the thermostatic element enabling the calibration of the thermostatic element to readily be changed.

A still further object of the present invention is to provide a safety control valve for gaseous fuel burners utilizing a power-type of thermostatic element operating a cam to operate a thermostatic gas shut-off valve to shut off the flow of gas to the burner, and biasing the power member of the thermostatic element in a retracted position by a spring, and varying the temperature range at which the valve operates by varying the position of the cam with respect to the valve by operation of a main operating knob for the gas valve.

These and other objects of our invention will appear from time to time as the following specification proceeds and with reference to the accompanying drawings wherein:

Figure 1 is a plan view of a safety fuel valve constructed in accordance with our invention;

Figure 2 is a sectional view taken substantially along line II—II of Figure 1;

Figure 3 is a fragmentary sectional view taken through the valve shown in Figure 1, and illustrating the gas passageway to the filter for pilot gas;

Figure 4 is a fragmentary sectional view taken through the valve, along substantially the same lines as Figure 2, and illustrating the means for calibrating the thermostatic element for effecting the shutting off of the supply of gas to the main burner;

Figure 5 is a detail plan view of the calibrating member for the thermostat;

Figure 6 is a sectional view taken substantially along line VI—VI of Figure 5;

Figure 7 is a geometrically developed view of a portion of the operating knob for the main burner valve and illustrating the cam arrangement for setting the safety shut-off valve, when the main burner valve is in its pilot position;

Figures 8 and 9 are geometrical developments of the seating surfaces of the body and plug for the main fuel valve;

Figures 10, 11, 12 and 13 are sectional views taken substantially along line X—X of Figure 2 and illustrating the different positions of the main fuel valve for admitting fuel to the main gas burner; and Figures 14, 15, 16 and 17 are fragmentarily sectional views taken substantially along line XIV—XIV of Figure 3 and showing the different positions of the main fuel valve in relation to the outlet from the valve chamber, for supplying gas to the pilot burner.

In the embodiment of our invention illustrated in Figures 1 and 2 of the drawings, we have shown a gas supply and safety shut-off valve 10 of a type which may immerse a thermostatic element 11 in a medium being heated, or which may be strapped to the outside of a hot water tank or other member being heated, with the thermostatic element 11 in contact with the wall of the tank.

The valve 10 is shown as comprising a valve body 12 having a main gas inlet 13 leading into said valve body, a pilot gas outlet 14 leading from said valve body and a main burner gas outlet 15 leading from said valve body in spaced relation with respect to said pilot gas outlet.

Gas enters the valve body 12 from the inlet 13 to a valve chamber 16 communicating with a passageway 17 through a valve seat 18 and a port 19, forming a continuation of the inner margin of said valve seat. A safety shut-off valve 20, held open by thermal electric current is provided to engage the seat 18 and shut off the flow of gas upon failure of the pilot flame. The passageway 17 in turn leads to a plug or rotary valve 21, herein shown as being generally frusto-conical in cross-section and being rotatable within a frusto-conical valve chamber 23 communicating with a thermostatic shut-off chamber 24 through a port or passageway 25 leading from the chamber 23.

A snap-acting shut-off valve 26 operated by the thermostatic element 11 is shown as being engageable with a valve seat 27 with a snap-action, when the temperature to which the thermostatic element 11 is subjected reaches the operating range of the thermostat. The seat 27 is shown as being formed integrally with a seating member 29 for the valve, threaded within a threaded wall 30 of the valve chamber 24. The inner margins of the valve seat 27 terminate into a shouldered port or passageway 31 leading through the seating member 29 and having communication with the outlet passageway 15 through a passageway 32 leading through the wall 30.

The shouldered portion of the passageway or port 31 is shown as forming a seat for a spring 35 biasing the valve 26 into its open position.

The seating member 29 is also shown as having an annularly shouldered seat 36 formed therein for a snap-acting disk 37 carrying the valve 26 on a stem 39 thereof, and engaged by an annular fulcrum 40 inwardly of the seat 36, for snapping the disk 37 and the valve 26 into closed position into engagement with the seat 27, to shut off the flow of gas to the main burner outlet passageway 15. The annular fulcrum 40 is shown as being formed integrally with an operating member 41 for the valve 26 and as having a stem 43 slidably guided in a passageway 44. A ball 45 in the passageway 44 is shown as abutting the end of the stem 43 and as engaging a recessed inclined camming surface 46 formed in a cam member 47 threaded on an operating rod 49 for said cam member.

The cam member 47 is movable along a passageway 50 forming a downward continuation of the valve chamber 23 and is shown as being retained from rotatable movement by a key screw 51 threaded in the valve body 12 and engaging a slot 53 extending along said cam member.

A compression spring 54 abuts the cam member 47 at one of its ends and is seated at its opposite end in the end wall of an inverted cup-like retainer 55, extending within the valve chamber 23 and a hollow interior portion 57 of the plug valve 21. A snap ring 59 is shown as retaining the retainer 55 to the chamber 23. The compression spring 54 also biases the rod 49 into engagement with a power member or plunger 60 of the thermostatic element 11 and serves as a return spring for said thermostatic element.

The thermostatic element 11 is herein shown as being of the so-called wax or power-type of thermostatic element, such as is shown and described in the Vernet Patent No. 2,368,181 dated January 30, 1945, although it need not be of this form, and may be of various other forms desired. This thermostatic element has been selected for its extreme simplicity and efficiency and its resultant low cost and for the relatively long travel of its power member 60 and the relatively great power of operation thereof in comparison with other types of thermostatic elements.

In the thermostatic element shown, a fusible thermally responsive material (not shown); which may be wax alone, a wax having a metallic heat conductor contained therein, or a wax, a metal powder, and a binder; is carried in a casing 61 of the thermostatic element and acts against a membrane or deformable member (not shown), to extend the plunger or power member 60 from a cylinder 63 when the temperature to which the casing 61 is subjected reaches the operating range of the thermostatic element.

As herein shown, the cylinder 63 of the thermostatic element 11 is threaded within the end of the body 12 to close the end of said body and position the power member 60 in axial alignment with the plunger 49 and the axis of the plug valve 21.

Upon extension of the power member or plunger 60 from the cylinder 63 as the temperature to which the casing 61 is subjected reaches the fusion point or operating range of the thermostatic element 11, the inclined camming surface 46 will come into engagement with the ball 45 and move said ball along the passageway 44 at right angles to the passageway 50 to operate the operating member 41 to snap the disk 37 past center and close the valve 26 against the spring 35 with a snap action.

The safety valve 20, maintained open by thermal electric current generated by the heat of the pilot flame, is shown as being biased into engagement with the valve seat 18 by means of a compression spring 66. The valve 20 is held open, out of engagement with the valve seat 18, by means of a thermal electromagnet 67, energized by a thermocouple (not shown), the tip of which may be adjacent the pilot flame.

The valve 20 is shown as being carried on a slidable plunger 69 guided in an end wall 70 of the valve chamber and extending within a cup-like closure member 71 for the electromagnet 67. An armature 73 is shown as being carried on the end of the plunger 69 for engagement with the electromagnet 67 for holding the valve open against the spring 66 when said electromagnet is energized by thermal electric current generated by the heat of the pilot flame.

The plunger or stem 69 extends through the port or passageway 19 into the passageway 17 within a hollow interior portion 74 of a push button 75 guided in a passageway 76 in the wall of the valve body 12 and suitably sealed thereto. The plunger 69 is shown as having a slot 77 extending therealong within which extends a pin 79, mounted at its ends in the wall portion of the plunger 75 defining the hollow interior portion 74 thereof. A spring 80 is shown as biasing the push button 75 in an outwardly extended position with respect to the valve body 12.

The outer end of the push button 75 is shown as being rounded and as having slidable engagement with a camming recess 81 formed in and extending around the bottom of an operating knob 83 for the plug valve 21. The camming recess 81 is shown in Figure 7 as having a camming face 84 inclined outwardly or downwardly from the bottom of said camming recess and coming to a flat peak at the pilot position of the plug valve 21. Turning of the knob 83 and valve 21 to its pilot position will thus depress the push button 75 and open the safety control valve 20 and engage the armature 73 with the electromagnet 67. The pilot igniting and the heat of the pilot flame generating sufficient thermal electric current to energize the electromagnet 67 with sufficient strength to hold the armature in engagement with said electromagnet, the valve 20 will remain open as long as the pilot is lit.

The control knob 83 is shown as being secured to the upwardly projecting end portion of a hollow boss 88 extending upwardly from an intermediate wall 89 of the plug valve 21 and opening to the hollow interior 57 of said plug valve. A machine screw 90 is shown as being threaded within the hollow interior of the boss 88, to retain the knob 83 thereto and to afford access to an adjusting or calibrating member 91, for the operating rod 49 and thermostatic element 11, as will hereinafter more clearly appear as this specification proceeds.

The plug valve 21 is shown as having an outwardly opening annular recess 93 extending about the boss 88 and forming a seat for a compression spring 94 which exerts a sealing force on the plug valve, seated at its opposite end against a washer 95, retained within the valve body and chamber 23 as by a snap ring 96.

The adjusting or calibrating member 91 is shown as being hollow and as having a closed upper end portion having a slot 97 extending thereacross and adapted to receive a screwdriver or like tool. The operating rod 49 extends within the hollow portion of the calibrating member 91 and has an upwardly open slot 99 extending along opposite sides of a drive pin 100, carried at its opposite ends in the wall defining the hollow portion of said calibrating member. The calibrating member 91 also has a radial flange 101 extending therefrom intermediate its ends, and abutted at its undersurface by a spring 102, shown as being seated in slots 103 formed in spaced inwardly extending legs 104 extending inwardly of the wall defining the hollow interior 57 of the plug valve 21 and formed integrally therewith. The opposite surface of the radial flange 101 from the spring 102 is provided with a plurality of radial serrations 105 registrable with radial serrations 106 on the inner surface of the wall portion 89 of the plug valve 21, to effect turning movement of the operating rod 49 upon turning of the plug valve to its various operative positions, and thus to vary the position of the sloping camming surface of the camming recess 46 with respect to the ball 45, to vary the temperature at which the thermostatic element 11 operates to close said valve.

When it is desired to calibrate the thermostatic element 11, it is merely necessary to remove the machine screw 90 and insert a screwdriver through the hollow interior of the boss 88 into engagement with the slot 97 of the calibrating member 91 and depress said calibrating member 91 to disengage the serrations thereof from the serrated portion 106 of the plug valve 21 (Figure 4) and then turn the calibrating member 91 and plunger 49 as required to attain the desired temperature setting.

Referring now in particular to the plug valve 21 and the chamber or valve seat 23, within which the plug valve 21 is seated, as shown in Figure 2 and in Figures 8 through 17, the chamber or seat 23, as shown in Figures 8 and 14, has the inlet passageway 17 leading through the wall thereof. Said seat 23 has an outlet passageway 107 leading therefrom, for supplying gas to the pilot burner through a filter 108 in a filter chamber 109 communicating with the pilot gas outlet 14. An arcuate or circumferential groove 110 is shown as being formed in the wall of the chamber 23 in communication with the outlet 107. A second arcuate or circumferential groove 111 is formed in the seat or wall of the chamber 23. The grooves 110 and 111 afford passageways for pilot gas as the plug valve 21 is moved from its pilot position into position to admit gaseous fuel to the main burner and as it moves from the main burner position to the extreme high temperature position shown in Figure 17.

The plug valve 21 is provided with a groove 112 formed in the wall thereof and of sufficient height to communicate with the grooves 111 and 110 of the valve body 23 as well as the inlet 17. The groove 112 is shown as having communication with an arcuate port 113 having communication with the hollow interior of the valve. The groove 112 also registers with the grooves 111 and 110 as the plug valve is turned from its "off" to its various "on" positions. The plug valve 21 is also provided with an arcuate groove 114 formed therein and affording a gas passageway from the inlet 17 to the pilot outlet 107 when the plug valve is in its pilot position, and as it is turned to its various "on" positions.

An arcuate port 116 leads through the wall of the plug valve 21 at a lower elevation than the groove 114 and communicates with the arcuate groove 112 formed in the plug valve 21.

The flow of fuel in the various positions of the shut-off plug valve 21 may thus be clearly seen from Figures 10 through 17. In Figures 10 and 14, the plug valve 21 is shown in its off position. The wall of the valve thus blocks communication of inlet passageway 17 with the groove 110 in the wall of the valve seat 23 and also blocks communication of inlet passageway 17 with the interior of the body of the valve 21.

As the valve is rotated in a counterclockwise direction by operation of the knob 83 into its pilot position shown in Figures 11 and 15, the wall of the plug valve 21 will block communication of inlet passageway 17 with the interior of the valve through the ports 113 and 116 (Figure 11). The groove 114, however, will be turned into registry with the inlet 17 to admit gas to the pilot outlet 107 and accommodate the pilot to be lit. At the same time the cam 84 will have depressed the plunger 75 and will hold the flame safety valve 20 open and the armature 73 in engagement with the electric magnet 67. As the pilot is ignited, the heat of the pilot flame will generate thermal electric current to energize the electromagnet 67 and maintain the flame safety valve 20 open against the bias of the spring 66.

As the knob 83 and plug valve 21 are turned in a counterclockwise direction to the next position as illustrated in Figures 12 and 16, the cam 84 will have moved off the plunger 75 and said plunger will engage with the low portion of the camming groove 81. The flame safety shut-off valve 20 will then be held open solely by thermal electric current, and will shut off only when the pilot burner may be extinguished for one reason or another.

In this position of the plug valve 21, gas will be admitted through the seat 18 through the inlet 17 and will pass from the inlet 17 along the annular groove 112 and to the interior of said plug valve through the ports 113 and 116. The main burner may then be supplied with gas and be ignited by the flame of the pilot burner. As the knob 83 and plug valve 21 are turned in a counterclockwise direction, the adjusting or calibrating member 91 will be turned through the respective serrations 105 and 106. This in turn will turn the operating rod 49 in a counterclockwise direction and move the camming member 47 along the rod 49 in a direction to increase the distance necessary for the cam member 47 to move to engage the ball 43 and operate the valve 26, and increase the temperature at which the thermostatic element 11 operates the valve. The thermostatic element 11, being properly calibrated, will be set to operate the shut-off valve 26 to shut off the supply of gas to the main burner when the temperature to which the thermostatic element is subjected reaches the temperature for which the thermostatic element is set, which may be 140°.

Turning of the valve from the position shown in Figures 12 and 16 to that shown in Figures 13 and 17 will admit gas from inlet passageway 17 to the pilot burner through the port 113, the groove 111, the groove 114 and the groove 110 communicating with the pilot outlet 107. Communication between inlet passageway 17 and the main burner will be afforded through the groove 112 and the ports 113 and 116 in the valve body leading to the hollow interior thereof. Turning of the knob 83 to move the valve to its various "on" positions will further move the cam member 47 along the plunger 49 toward the thermostatic element 11, and will increase the travel of said thermostatic element necessary to engage the sloping camming face 46 with the ball 45, to cause the valve 26 to snap closed. This will thus increase the temperature at which the thermostatic element 11 closes the valve 26. The temperature at which the thermostatic element may operate in the position shown in Figures 13 and 17 may be 180° F.

It is, of course, understood that the calibration of the thermostatic element may be changed to operate the shut-off valve 26 at either higher or lower temperatures as desired and that each degree of turning movement of the knob 83 and plug valve 21 from the position shown in Figures 11 and 15 to that shown in Figures 13 and 17 will progressively increase the temperature at which the thermostatic element 11 operates to close the valve 26.

The degree of heat of the hot water heater or the device to which the valve 10 may be applied, may thus be varied by simply turning the operating knob for the plug valve 21, with a resultant turning of the valve, and in each temperature position of the valve and knob 83, there will be a continuous supply of gas from the inlet 17 to the pilot and the main burner as long as the flame safety valve 20 and the shut-off valve 26 are open, or as long as the pilot burner is ignited and the temperature of the medium being heated is below the operating temperature of the thermostatic element.

It may be seen from the foregoing that a simplified form of safety gas supply valve has been provided for supplying gaseous fuel to a pilot and main burner, and that the necessity of resetting the safety valve by a separate operation each time the flame goes out is eliminated, and that a single knob resets the safety valve as the knob is turned to its pilot position, releases the safety valve as the knob is turned to an on position for the burner and sets the thermostatic element to operate at progressively higher temperatures during continued turning movement of the knob.

It will be understood that modifications and variations of the present invention may be effected without departing from the spirit and scope of the novel concepts thereof.

We claim as our invention:

1. In a safety gas control valve, a valve body, an inlet into said valve body, an outlet from said valve body, a rotary valve controlling the supply of gas from said inlet to said outlet, a thermostatically operated shut-off valve for shutting off the flow of gas through said outlet upon predetermined temperature conditions, a thermostatic element for operating said shut-off valve comprising a cylinder threaded within said valve body, a casing on the outside of said valve body having communication with said cylinder and containing a fusible thermally expansible material, and a power member extensibly movable with respect to said cylinder upon fusion of the fusible material within said casing, a plunger in axial alignment with said power member, a cam member held from rotatable movement and threaded on said plunger and having operative connection with said valve for shutting off the same upon extension of said power member from said cylinder, a spring engaging said cam member and biasing said plunger into engagement with said power member, a knob for turning said rotary valve, and a releasable drive connection between said knob and said plunger for rotating said plunger upon turning movement of said knob and rotary valve to move said cam member toward said power member and increase the temperature range of operation of said shut off valve, upon turning movement of said valve to admit gas through said outlet, said drive connection being operative to turn said plunger independently of said knob and rotary valve, to calibrate said thermostatic element by varying the position of said cam with respect to said power member.

2. In a safety gas control valve, a rotary valve for controlling the supply of gas to a main burner, a thermostatic valve for shutting off the supply of gas to the main burner upon predetermined temperature conditions, thermostatic means for operating said thermostatic valve, said thermostatic means comprising a casing containing a fusible thermally expansible material, a power member extensible from said casing upon fusion of the thermally expansible material, an operating rod in axial alignment with said power member, an operating cam for said thermostatic valve threaded on said operating rod, and a spring engageable with said cam and biasing said rod into engagement with said power member, a knob for turning said rotary valve from closed to open positions, and a drive connection from said rotary valve to said operating rod for turning said rod to vary the position of said cam with respect to said power member and thus vary the operating range of said thermostatic valve comprising an inturned shoulder on said rotary valve having radial serrations thereon, a drive member having driving connection with said rod and mounted for axial movement with respect thereto and having radial serrations thereon facing the serrations of said shoulder, and a spring biasing said drive member into engagement with said shoulder, said drive member being releasable from said shoulder by moving the same against its spring bias to accommodate the calibration of said thermostatic means independently of turning movement of said knob.

3. In a safety shut-off and thermostatic valve for gaseous fuel burners, a valve body, an inlet into said valve body, two outlets from said valve body, one being a main burner outlet for main burner gas and the other being a pilot outlet for pilot gas, a rotatable valve controlling the passage of gas from said inlet to said pilot gas outlet and said main burner gas outlet in sequence, a safety control valve controlling the passage of gas from said inlet to said rotatable valve, spring means biasing said safety control valve in a closed position, manually operable means for setting said safety control valve in an open position, an electromagnet energized by thermal electric current for holding said safety control valve open against the bias of its spring upon the presence of a pilot flame, a thermostatically operated valve shutting off the flow of gas through said main burner outlet upon predetermined temperature conditions, a power thermostat for operating said thermostatically operated valve comprising a cylinder threaded within said valve body, a casing extending therefrom on the outside of said valve body and containing a fusible thermally expansible material, and a power member extensible from said cylinder upon fusion of the fusible material within said casing, for operating said thermostatically operated valve, the operating means for said thermostatically operated valve comprising a plunger in axial alignment with said power member, a cam threaded on said plunger and held from rotation with respect thereto, and a spring biasing said plunger into engagement with said power member and returning said power member within said cylinder, a releasable drive connection from said rotatable valve to said plunger for rotating said plunger and moving said cam along said plunger to vary the operating range of said thermostatically operated valve, and a knob for rotating said rotatable valve from closed to open positions to admit gas to said pilot and main burner outlets in succession, and successively increasing the operating range of said thermostatically operated rotatable valve upon turning movement of said valve from closed to open positions, said knob having cam means thereon engageable with said manually operable means for setting said safety control valve as said rotatable valve is turned to its pilot position, said cam means releasing said manually operable means as said rotatable valve is turned past its pilot position.

References Cited in the file of this patent
UNITED STATES PATENTS

| | | |
|---|---|---|
| 2,387,164 | McCarty | Oct. 16, 1945 |
| 2,439,336 | Dillman | Apr. 6, 1948 |
| 2,557,927 | Abrams | June 26, 1951 |
| 2,650,028 | Grayson | Aug. 25, 1953 |
| 2,650,766 | Brown et al. | Sept. 1, 1953 |
| 2,658,686 | Caparone | Nov. 10, 1953 |
| 2,690,873 | Vaughn | Oct. 5, 1954 |
| 2,696,877 | Hollman | Dec. 14, 1954 |
| 2,799,454 | Rouse | July 16, 1957 |